United States Patent [19]
Mailey et al.

[11] Patent Number: 5,237,311
[45] Date of Patent: Aug. 17, 1993

[54] HINGEDLY SUPPORTED INTEGRATED TRACKBALL AND SELECTION DEVICE

[75] Inventors: Frederick C. Mailey, South Euclid; Robert A. Cecil, Solon, both of Ohio

[73] Assignee: Picker International, Inc., Highland Hts., Ohio

[21] Appl. No.: 738,889

[22] Filed: Aug. 1, 1991

[51] Int. Cl.$^5$ .............................................. G09G 3/02
[52] U.S. Cl. ..................... 340/710; 340/709; 340/710; 273/148 B
[58] Field of Search ............... 340/710, 709, 706; 74/471 XY; 273/438, 148 B

[56] References Cited

U.S. PATENT DOCUMENTS

| | | | |
|---|---|---|---|
| 4,371,813 | 2/1983 | Dollheimer et al. | 315/377 |
| 4,562,347 | 12/1985 | Hovey et al. | 250/221 |
| 4,763,116 | 8/1988 | Eichholz | 340/518 |
| 4,787,051 | 11/1988 | Olson | 364/518 |
| 4,801,931 | 1/1989 | Schmidt | 340/710 |
| 4,818,978 | 4/1989 | Kurihara et al. | 340/710 |
| 4,853,630 | 8/1989 | Houston | 340/709 |
| 4,933,670 | 6/1990 | Wislocki | 340/709 |
| 4,939,508 | 7/1990 | Lawrence et al. | 340/710 |

FOREIGN PATENT DOCUMENTS

| | | |
|---|---|---|
| 0296837 | 12/1988 | European Pat. Off. . |
| 3045133 | 7/1982 | Fed. Rep. of Germany ...... 340/709 |
| 3726939A1 | 8/1988 | Fed. Rep. of Germany . |
| 0181818 | 9/1985 | Japan ................... 340/710 |
| 60-207921 | 10/1985 | Japan . |
| 2220466 | 1/1990 | United Kingdom . |
| 2221016 | 1/1990 | United Kingdom . |

OTHER PUBLICATIONS

FastTRAP Advertising Brochure, ®1987 Microspeed, Inc., Freemont, Calif.

*Primary Examiner*—Tommy Chin
*Assistant Examiner*—A. Au
*Attorney, Agent, or Firm*—Fay, Sharpe, Beall, Fagan, Minnich & McKee

[57] ABSTRACT

A trackball (10) is rotatably mounted on rollers (12, 14). The rollers are connected with rotational encoders (16, 18) for producing a series of pulses. Up/down counters (20, 22) convert the pulses into an indication of translation along two axes. Downward, non-rotational pressure on the trackball causes a transducer (B) to output an electrical signal which is recognizable as a selection signal. In some embodiments, the transducer is a strain gauge or other transducer (50) which provides an output whose magnitude varies with the amount of force. A comparitor (54) compares the output of the transducer with a selectable threshold to indicate whether a selection signal is to be issued. In other embodiments, the transducer has two states, e.g. a mechanical switch (70). The transducer changes states in response to the force on the trackball exceeding a preselected minimum.

10 Claims, 3 Drawing Sheets

HINGEDLY SUPPORTED INTEGRATED TRACKBALL AND SELECTION DEVICE

BACKGROUND OF THE INVENTION

The present invention relates to computer input devices. It finds particular application in conjunction with multi-axis direction and motion encoding and selection devices and will be described with particular reference thereto.

Heretofore, two and three-dimensional trackballs have been readily available. Typically, a two-dimensional trackball was supported on two perpendicular rollers. Frictional engagement between the ball and the rollers caused rotation of the ball to be translated into corresponding rotation of each roller. More specifically, the rotation of each roller was indicative of rotation of the ball relative to an axis parallel to the central axis of the roller. Encoders were connected with each roller to convert the rotation of the corresponding roller into electrical signals, e.g. an electrical pulse signal for each increment of rotation. For a three-dimensional trackball, a third roller was typically positioned orthogonal to the other two to contact a side of the trackball.

Commonly, the trackball has been utilized to move a curser to selected regions of a video display. Upon reaching a desired position, e.g. a menu selection, the operator lifted his hand from the trackball and depressed a nearby selection button to indicate selection of the menu item associated with the curser.

One of the problems with lifting one's hand from the trackball is that the hand motion sometimes applied rotational forces to the ball causing it to reposition itself, i.e. the cursor moved.

Other operators maintained contact with the trackball with the palm of the hand or some fingers while reaching for the selection button with another finger. In this manner, the operator was able to maintain continued contact with the trackball, hence continuous positional control of the cursor. However, reaching for the selection button sometimes caused unwanted rotation of the trackball.

Not only was the separate selection device, typically a pushbutton, cumbersome, it was also more expensive to manufacture and produce.

The present invention contemplates a new and improved integrated trackball and selection device which overcomes the above-referenced problems and others.

SUMMARY OF THE INVENTION

In accordance with the present invention, a selection device and a trackball are directly integrated.

In accordance with a more limited aspect of the present invention, a trackball assembly generates at least two direction signals in accordance with rotational movement of a trackball and a selection signal in response to downward pressure on the trackball.

In accordance with a more limited aspect of the present invention, a transducer, such as a mechanical switch or strain gauge is placed below the trackball assembly to convert downward movement or pressure on the trackball assembly into the selection signal.

In accordance with another more limited aspect of the present invention, the transducer is mounted to internal supports or structures of the trackball assembly to sense downward force or movement of the trackball relative to the supporting structures within the trackball assembly.

One advantage of the present invention is that it integrates the trackball and selection device.

Another advantage of the present invention is that it eliminates the awkward repositioning of fingers for engaging a separate pushbutton or other selection device. True one hand (or even one finger) operation is possible.

Another advantage of the present invention resides in its reduced cost.

Another advantage of the present invention resides in its compactness.

Still further advantages of the present invention will become apparent to those of ordinary skill in the art upon reading and understanding the following detailed description of the preferred embodiments.

BRIEF DESCRIPTION OF THE DRAWINGS

The invention may take form in various parts and arrangements of parts, and in various steps and arrangements of steps. The drawings are only for purposes of illustrating the preferred embodiments and are not to be construed as limiting the invention.

DETAILED DESCRIPTION OF THE PREFERRED EMBODIMENTS

A multi-axis trackball assembly A converts rotational movement into displacement or rotation relative to two or more axes. A selection device B converts non-rotational or downward force into a selection signal.

Figure 1:
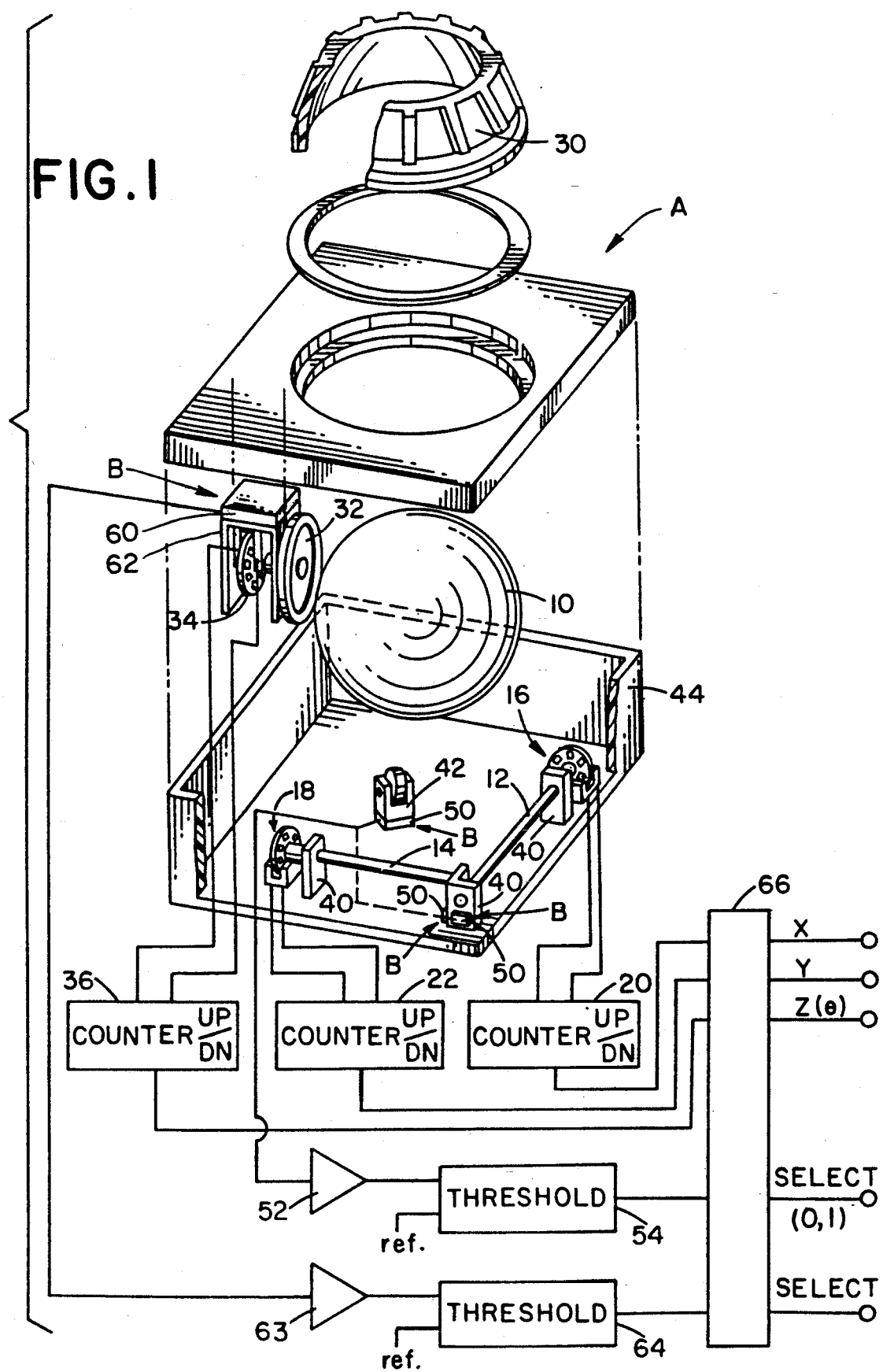
FIG. 1 is an exploded view of a multi-axis trackball assembly in accordance with the present invention.

With reference to FIG. 1, the trackball assembly A includes a solid or hollow spherical member 10 of plastic or the like. The ball member 10 is supported on a first rod or roller member 12 and a second roller member 14 orthogonal to the first. The first roller member is connected with a rotation sensing means or encoder 16 for converting rotation of the first roller member into a first rotationally encoded signal, e.g. a train of pulses, each pulse indicative of a preselected angular increment of rotation in a direction perpendicular to the axis of the associated rod. A second rotation sensing or encoding means 18 converts rotation of the second rod into a second rotationally encoded signal. Optionally, a third rod may be mounted orthogonal to the first and second rods in contact with the ball member to drive a third rotation sensor or encoder means. Various rotation sensors may be utilized for generating a pulse train. For example, the rollers may rotate a disk with a series of apertures at even angular increments therearound. A light emitting diode on one side of the disk may transmit light through the apertures to a light sensitive diode or other light sensitive structure. The transmission and interruption of the light as the apertures and solid portions of the disk move between the light emitter and light sensor, generate the appropriate pulse train. By using a pair of photodiodes or other light detectors, a pair of pulse trains can be generated whose frequency varies with rotational speed and whose phase indicates the direction of rotation.

A first resolving means 20, such as an up/down counter is connected with the first rotation sensor 16. A phase indication controls the counter to count up or down and each pulse increments the counter in the appropriate direction. In this manner, the first position resolver or counter converts the pulse train into an indication of rotation in a first direction. Analogously, a second resolver 22, such as an up/down counter, converts the output of the second resolver into an indication of movement relative to a second axis. Analogously, an additional resolver may be provided for converting movement of the ball relative to the third axis into a third relative position or movement indication.

In the embodiment of FIG. 1, encoding along a further axis is provided by a ring or collar 30 which surrounds the ball lo and is rotatable independently thereof. A roller 32 engages the ring to move a rotation sensor or encoder 34 that generates a pulse train in accordance with the movement of the ring 30. Another up/down counter 36 converts the pulse train and phase information into an indication of the angular position of the ring 30.

The selection device B produces a select signal or pulse in response to downward pressure on at least one of the ball member and the ring. It is to be appreciated, that downward pressure on the ball member causes a corresponding force to be exerted on the rollers 12, 14 on support posts and other structures 40 for the rollers, on ancillary support member 42 which with the rollers provides three-point support for the ball member, a housing 44, and the like. Downward force on the ball member can cause deflection of the rollers, deflection of the rollers within the support members 40, deflection of the support members, and the like. In the illustrated embodiment, a transducer 50, such as a strain gauge or other electric force sensor means, is affixed to one of the structures that are flexed, strained, or moved by force exerted on the ball member. The strain gauge 50 is connected with an amplifier 52 and a threshold comparing means 54. The threshold comparing means determines whether the sensed strain exceeds a selected, adjustable threshold. In this manner, the amount of force which must be applied to the ball to signal a selection is adjustable.

Analogously, the selection device may include a ring force detector 60 such as a strain gauge or mechanical switch which is interconnected with the ring 30. The force detector might be located below the ring member, on a mounting structure 62 for the ring member motion sensing or encoding transducer, 32, 34 or the like. The ring member force detector is connected with an amplifier 63 and a comparing means 64. The comparing means 64 compares the signal from the strain gauge 60 with an adjustable threshold or reference value. A means 66 transforms the counts of counters 20, 22, 36 to x, y, and z (or θ) coordinate values and the outputs of threshold circuits 54, 64 to select or enable signals, such as a "0" or a "1", on or off, etc.

Figure 2:
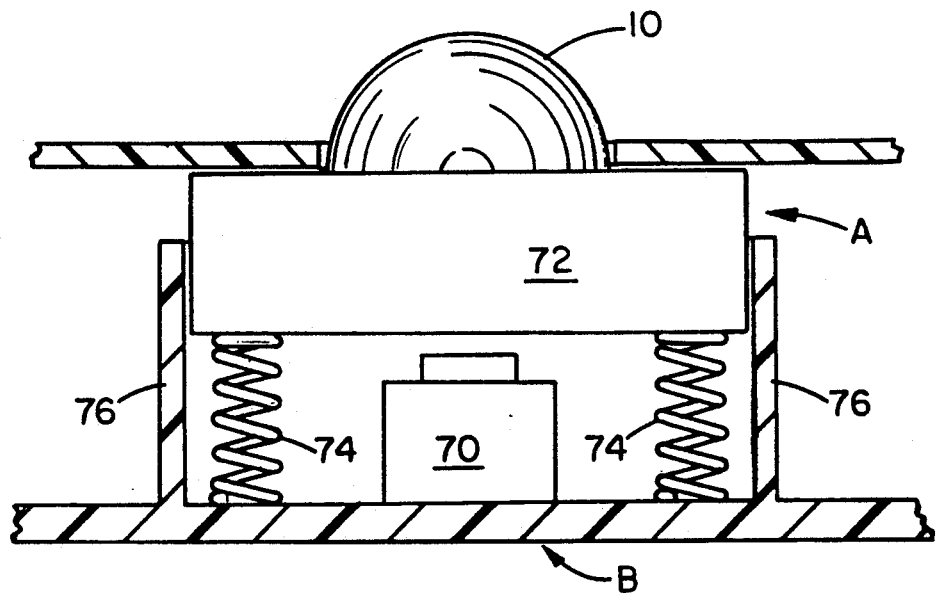
FIG. 2 is another embodiment of an integrated trackball and selection device in accordance with the present invention.

With reference to FIG. 2, the selection device B may also include a mechanical switch transducer 70. A housing 72 for the trackball assembly is mounted on springs 74. The springs are relatively stiff such that the trackball assembly feels firm, but provide for sufficient movement or travel to enable the housing 74 to contact the mechanical switch 70. Alignment guides 76 constrain the trackball assembly A to vertical movement.

Figure 3:
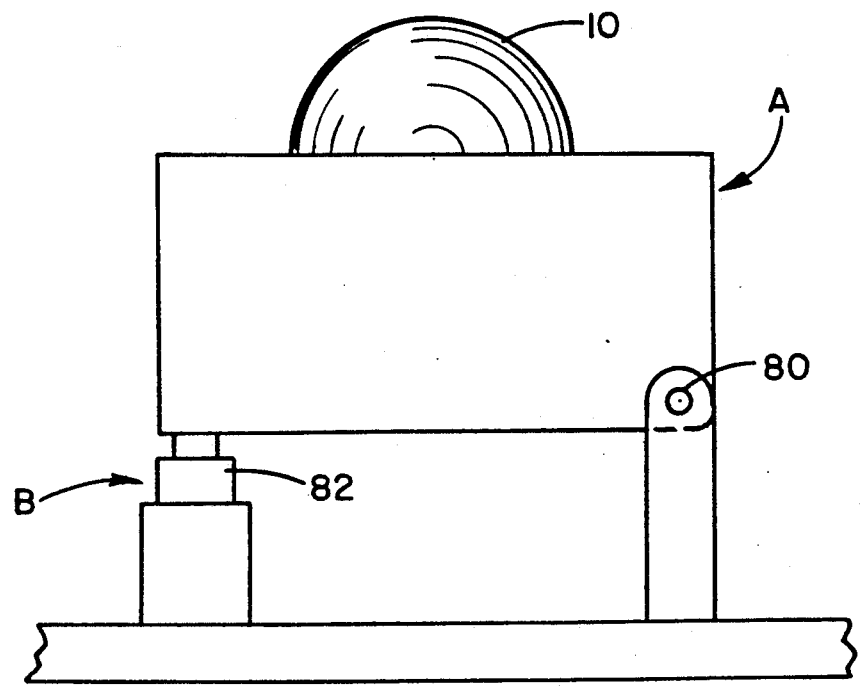
FIG. 3 is another embodiment of an integrated trackball and selection device in accordance with the present invention.

In the embodiment of FIG. 3, the trackball housing is mounted on a hinge so adjacent one side thereof. A mechanical switch 82 supports the other side. Downward pressure on the trackball urges the trackball assembly A to pivot relative to the hinge, changing the state of the mechanical switch 82.

Figure 4:
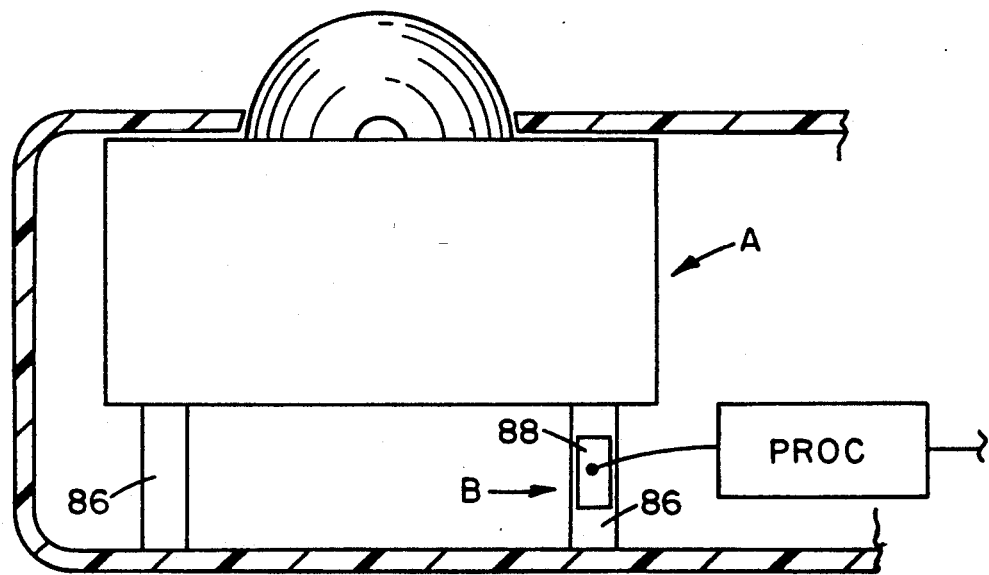
FIG. 4 is another embodiment of an integrated trackball and selection device in accordance with the present invention.

With reference to FIG. 4, the trackball housing A is mounted on a plurality of support members 86. Downward pressure on the trackball assembly A causes a support member 86 to deform causing a corresponding output signal from strain gauge 88.

Figure 5:
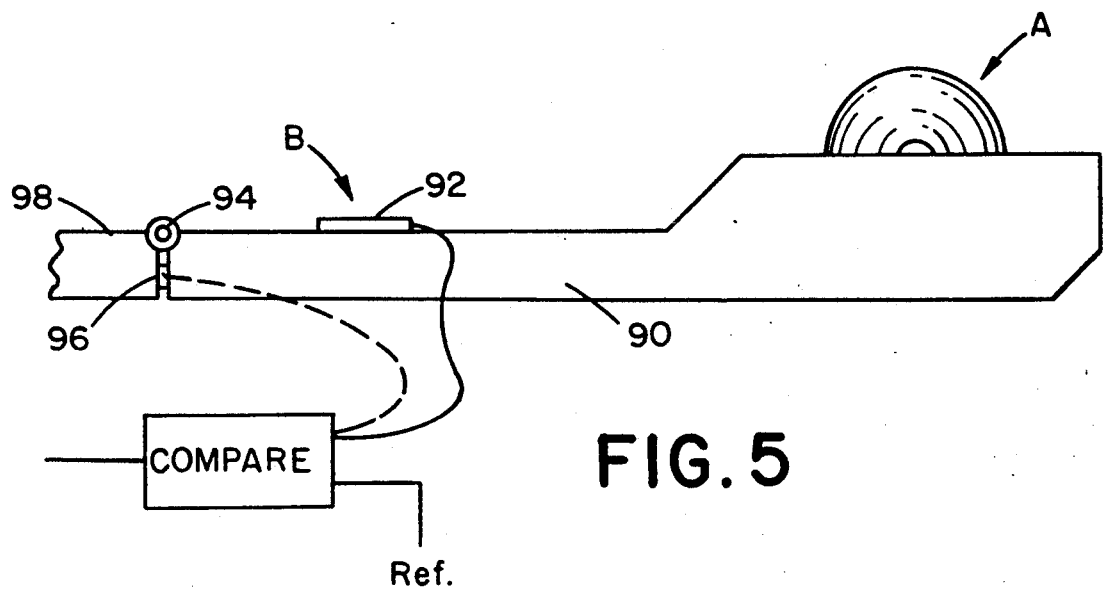
FIG. 5 is another integrated trackball and selection device in accordance with the present invention.

With reference to FIG. 5, the trackball assembly A is mounted on an arm member 90. A deformation of monitoring means such as the strain gauge 92 is connected with the arm to detect deformation thereof. Alternately, the arm may be supported by a hinge 94. A movement detecting transducer 96 is disposed between the arm and an associated stationary housing 98 to be compressed by downward pressure on the arm.

Various types of transducers are contemplated. As illustrated above in the specific examples, mechanical switches and strain gauges may be used. Various other types of transducers such as inductive pick-ups which sense relative movement of a magnetic or ferrous member, capacitive pick-ups which sense proximity or relative movement of two plates or portions of a capacitor, Hall effect transducers which detect movement of a magnet, piezoelectric transducers which generate electrical potentials in response to pressure, and the like.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. An integrated trackball and selection device comprising:
   a ball member;
   means for rotatably supporting the ball member in a housing with a portion of the ball member extending from only an upward side of the housing;
   means for converting rotational movement of the ball member into at least first and second signals indicative of rotation of the ball member relative to first and second axes, respectively;
   a hinge pivotally supporting one side of the housing;
   a transducer means for converting non-rotational force on the ball member in excess of a preselected threshold level into an electrical selection signal, the transducer means supporting the housing at a point remote from the hinge such that downward pressure on the ball member tends to rotate the housing about the hinge and apply force to the transducer means.

2. The device as set forth in claim 1 wherein the means for rotatably mounting the ball member includes at least two rollers and wherein the converting means include means for converting rotation of the rollers into a series of pulses and a resolver means for resolving the series of pulses into the first and second signals.

3. The device as set forth in claim 1 further including guide means for limiting movement of the housing to a predetermined path.

4. The device as set forth in claim 1 wherein the transducer means includes at least one of a mechanical switch, a strain gauge, a Hall effect transducer, a piezoelectric transducer, an inductive transducer, a capacitive transducer, and an optical transducer.

5. The device as set forth in claim 1 wherein the housing includes a rolling member therein.

6. The device as set forth in claim 1 further including a spring means for at least partially supporting the housing and biasing the housing away from the transducer such that the spring means opposes downward pressure on the ball member and housing.

7. A method of selecting comprising:
manually rolling a ball member which extends from only an upper side of a ball member supporting structure by direct contact with a user's hand relative to at least two axes;
converting rotation of the ball member into electrical signals indicative of an amount of rotation along the two axes;
exerting a downward force directly on the ball member causing pivotal movement of the ball member supporting structure about a hinge point adjacent one edge of the ball member supporting structure;
converting the pivotal movement of the ball member supporting structure into an electrical selection signal.

8. The method as set forth in claim 7 wherein the pivotal movement converting step includes:
sensing the pivotal movement of the ball member supporting structure in response to the downward force;
comparing the sensed pivotal movement with a threshold value;
generating the selection signal in response to the comparing.

9. The method as set forth in claim 7 wherein the downward pivotal movement converting step includes:
changing states of a switch in response to the downward force.

10. A hinged trackball and selection device comprising:
a ball member rotatably supported in a ball member supporting structure the ball member extending only through an opening in an upper side of the ball member supporting structure such that the ball member is positioned for direct contact with a user's hand;
a means for converting rotational movement of the ball member into signals indicative of rotation of the ball member;
a hinge displaced from the ball member and connected adjacent one edge of the ball member supporting structure for pivotally supporting the ball member supporting structure relative to an associated stationary support structure;
a transducer means mounted between the ball member supporting structure and the stationary support structure for converting downward force on the ball member in excess of a threshold force into an electrical selection signal as the downward force urges the ball member supporting structure to rotate about the hinge and applies force to the transducer means.

* * * * *